(12) United States Patent
Cummings et al.

(10) Patent No.: US 9,933,777 B2
(45) Date of Patent: Apr. 3, 2018

(54) METHODS FOR SCHEDULE OPTIMIZATION SORTING OF DRY END ORDERS ON A CORRUGATOR TO MINIMIZE SHORT ORDER RECOVERY TIME

(71) Applicant: Marquip, LLC, Phillips, WI (US)

(72) Inventors: James A. Cummings, Phillips, WI (US); Ronald H. Schmidt, Phillips, WI (US)

(73) Assignee: Marquip, LLC, Phillips, WI (US)

( * ) Notice: Subject to any disclaimer, the term of this patent is extended or adjusted under 35 U.S.C. 154(b) by 249 days.

(21) Appl. No.: 14/747,373

(22) Filed: Jun. 23, 2015

(65) Prior Publication Data
US 2016/0004249 A1 Jan. 7, 2016

Related U.S. Application Data

(60) Provisional application No. 62/019,684, filed on Jul. 1, 2014.

(51) Int. Cl.
*G05B 19/418* (2006.01)

(52) U.S. Cl.
CPC ........ *G05B 19/41865* (2013.01); *Y02P 90/20* (2015.11); *Y02P 90/205* (2015.11); *Y02P 90/24* (2015.11)

(58) Field of Classification Search
CPC .. G05B 19/41865; Y02P 90/20; Y02P 90/205; Y02P 90/24
See application file for complete search history.

(56) References Cited

U.S. PATENT DOCUMENTS

| | | |
|---|---|---|
| 2,309,728 A | 2/1943 | Goettsch |
| 4,224,847 A | 9/1980 | Tokuno |
| 4,576,663 A | 3/1986 | Bory |
| 4,627,214 A | 12/1986 | Anderson et al. |
| 4,953,378 A | 9/1990 | Wallis |
| 5,090,281 A | 2/1992 | Paulson et al. |
| RE35,086 E | 11/1995 | Paulson et al. |
| 5,732,609 A | 3/1998 | Marschke |
| 6,022,017 A | 2/2000 | Cummings et al. |
| 6,117,381 A | 9/2000 | Cummings |
| 6,165,117 A | 12/2000 | Adami |
| 6,568,304 B2 | 5/2003 | Ito et al. |

(Continued)

*Primary Examiner* — Jennifer L Norton
(74) *Attorney, Agent, or Firm* — Andrus Intellectual Property Law, LLP

(57) ABSTRACT

A method and a non-transient computer readable medium for sorting orders to be run on a multi-section slitter/scorer at a corrugator dry end includes collecting specifications of orders in current, prior, and/or subsequent paper group queues. Run times and slit/score head recovery times for orders in the current paper group queue are calculated using the specifications. Those orders for which recovery time exceeds run time are flagged as short orders. For a given short order, pairs of preceding and following orders that would require recovery times less than the short order's run time are determined and flagged as potential bracketing pairs. The current paper group queue is searched to determine if a bracketing pair can be formed from its orders, and if so, the orders in the current paper group queue are reorganized such that the orders in the bracketing pair immediately precede and follow the given short order.

20 Claims, 10 Drawing Sheets

(56) References Cited

U.S. PATENT DOCUMENTS

| | | | |
|---|---|---|---|
| 7,370,562 B2 | 5/2008 | Adachi et al. | |
| 7,568,411 B2 * | 8/2009 | Cummings | B26D 5/00 156/207 |
| 7,568,412 B2 | 8/2009 | Cummings | |
| 8,267,847 B2 | 9/2012 | Cummings et al. | |
| 9,841,755 B2 * | 12/2017 | Yasuma | G05B 19/41865 |
| 2008/0177757 A1 * | 7/2008 | Knipfer | G06Q 10/087 |
| 2009/0120263 A1 * | 5/2009 | Suzuki | B26D 3/02 83/865 |
| 2009/0178528 A1 * | 7/2009 | Adami | B26D 7/2635 83/469 |
| 2010/0195141 A1 * | 8/2010 | Fan | G06F 3/126 358/1.15 |
| 2011/0219924 A1 | 9/2011 | Cummings | |
| 2012/0085483 A1 | 4/2012 | Cummings | |
| 2013/0029825 A1 * | 1/2013 | Rich | B41J 3/543 493/324 |
| 2013/0120799 A1 * | 5/2013 | Maeda | G06F 3/1296 358/1.15 |

* cited by examiner

| | | SLIT / SCORE HEAD RECOVERY TIME | | | | | | |
|---|---|---|---|---|---|---|---|---|
| | | # OUTS PRECEDING CURRENT ORDER | | | | | | |
| | | 8 | 7 | 6 | 5 | 4 | 3 | 2 | 1 |
| # OUTS FOLLOWING CURRENT ORDER | 1 | 41 | 40 | 31 | 27 | 22 | 19 | 14 | 11 |
| | 2 | 41 | 38 | 30 | 24 | (19) | 17 | 13 | |
| | 3 | 39 | 35 | 30 | 23 | 18 | 13 | | |
| | 4 | 38 | 33 | 26 | 19 | 13 | | | |
| | 5 | 38 | 32 | 23 | 17 | | | | |
| | 6 | 34 | 29 | 18 | | | | | |
| | 7 | 30 | 24 | | | | | | |
| | 8 | 23 | | | | | | | |

| Order No. | Order Length (m) | No. Outs | Trim Width (mm) | Run Time (sec) | Recovery Time (sec) |
|---|---|---|---|---|---|
| 134 | 119 | 2 | 96 | | |
| 135 | 110 | 3 | 20 | | |
| 136 | 32 | 3 | 71 | 16 | 17 |
| 137 | 100 | 2 | 90 | | |

| Order No. | Order Length (m) | No. Outs | Trim Width (mm) | Run Time (sec) | Recovery Time (sec) |
|---|---|---|---|---|---|
| 135 | 110 | 3 | 96 | | |
| 134 | 119 | 2 | 20 | | |
| 136 | 32 | 3 | 71 | 16 | 13 |
| 137 | 100 | 2 | 90 | | |

| Order No. | Order Length (m) | No. Outs | Trim Width (mm) | Run Time (sec) | Recovery Time (sec) |
|---|---|---|---|---|---|
| 202 | 74 | 2 | 86 | | |
| 203 | 144 | 5 | 85 | | |
| 204 | 30 | 2 | 114 | 15 | 19 |
| 205 | 140 | 4 | 32 | | |
| 206 | 565 | 2 | 32 | | |
| 207 | 118 | 2 | 110 | | |

| Order No. | Order Length (m) | No. Outs | Trim Width (mm) | Run Time (sec) | Recovery Time (sec) |
|---|---|---|---|---|---|
| 203 | 144 | 5 | 85 | | |
| 205 | 140 | 4 | 32 | | |
| 202 | 74 | 2 | 86 | | |
| 204 | 30 | 2 | 114 | 15 | 13 |
| 207 | 118 | 2 | 110 | | |
| 206 | 565 | 2 | 32 | | |

| Order No. | Order Length (m) | No. Outs | Trim Width (mm) | Run Time (sec) | Recovery Time (sec) |
|---|---|---|---|---|---|
| 190 | 219 | 2 | 20 | | |
| 191 | 31 | 2 | 100 | | |
| 192 | 157 | 2 | 20 | | |
| 193 | 141 | 2 | 22 | | |
| 194 | 40 | 3 | 22 | | |
| 195 | 60 | 1 | 103 | | |

| Order No. | Order Length (m) | No. Outs | Trim Width (mm) | Run Time (sec) | Recovery Time (sec) |
|---|---|---|---|---|---|
| 190 | 219 | 2 | 20 | | |
| 192 | 157 | 2 | 20 | | |
| 191 | 31 | 2 | 100 | | |
| 195 | 60 | 1 | 103 | | |
| 194 | 40 | 3 | 22 | | |
| 193 | 141 | 2 | 22 | | |

METHODS FOR SCHEDULE OPTIMIZATION SORTING OF DRY END ORDERS ON A CORRUGATOR TO MINIMIZE SHORT ORDER RECOVERY TIME

CROSS-REFERENCE TO RELATED APPLICATION

The present application claims the benefit of U.S. Provisional Application Ser. No. 62/019,684 filed Jul. 1, 2014, which is incorporated by reference herein.

FIELD

The present disclosure relates to scheduling of orders to be run on a corrugator dry end.

BACKGROUND

U.S. Pat. No. 4,627,214, which is incorporated herein by reference, discloses a machine frame that mounts a pair of upper and lower girder-like box beams of heavy construction. A plurality of upstream upper scoring assemblies and a plurality of downstream upper slitting assemblies are mounted on the upper box beam. The lower box beam also supports a plurality of upstream lower scoring assemblies and a plurality of downstream lower slitting assemblies. The assemblies include rotatably driven slitting or scoring blades. The box beams extend transversely of a traveling web. The assemblies include a motor connected to be driven along its beam, and an encoder, with all of the motors and encoders being electrically connected to a programmable computer. The computer may be pre-programmed with the position and spacing of all of the assemblies, so that upon the provision of a single input signal all of the motors simultaneously drive all of the assemblies to their desired position. A bearing block is engageable by an elongated cam rod extending along the beam. Rotation of the rod causes simultaneous locking of all assemblies in an array in position along the beam. Adjusting the caliper between opposing scoring blades is accomplished by mounting the upper box beam so that it is pivotable by an actuator upwardly about the axis of the rotatably driven shaft for the upper slitting assembly blades.

U.S. Pat. No. 6,117,381, which is incorporated herein by reference, discloses a gapless order change in a continuous running corrugated web, which is provided by utilizing a partial web sever extending transversely across the web upstream of a web selector device. The partial web sever allows the output web selector device to be readjusted downstream of the slitter-scorer to redirect the output webs between upper and lower cut-off knives as required. The partial web sever allows the order change to be effected with a continuous unbroken web containing the outs for the cut-off knife level handling the output web portions opposite the partial sever.

U.S. Pat. No. 7,568,412, which is incorporated herein by reference, discloses an order transition in a corrugator, which is accomplished by creating an overlap of the slits made by the slitting tools associated with the expiring (running) and new orders. However, the slit tool associated with the innermost slit between the upper and lower level outs is maintained in slitting contact with the board to extend the slit line into further overlap with the slits made by the new order tools to create an order change region. A lateral cut is made to connect the innermost slit between the upper and lower level outs on the new order and the slit created by the tool delayed from withdrawal in the running order. Trim cut transitions are handled in the same manner.

U.S. Patent Application Publication No. 2011/0219924, which is incorporated herein by reference, discloses a method for facilitating efficient order change in the dry end conversion of a corrugated paperboard web by looking ahead to as many as three orders scheduled to follow the running order and repositioning slit tools and score tools to unused positions in anticipation of the orders to follow. The method is particularly effective to preset the slit and score tools for an order that follows a short order that may have a running time as short as 20 seconds.

U.S. Pat. No. 8,267,847, which is incorporated herein by reference, discloses a method and apparatus for performing an order change in a corrugator that uses a minimum slit head configuration with all slit heads carried on two sides of a single tool support structure. A single robot is operable on the support structure to independently reset the positions of slit heads during a running order to prepare for subsequent order change in a most efficient manner, utilizing order scheduling that eliminates order changes that cannot be formed with the minimum slit head configuration.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

The present invention pertains to a method for schedule optimization sorting of order changes in the dry end conversion of a corrugated paperboard web. In particular, the invention relates to a method for schedule optimization sorting of dry end orders on a corrugator to minimize short order recovery time.

In one example, a method for sorting orders to be run on a multi-section slitter/scorer at a corrugator dry end includes collecting specifications of orders in a current paper group queue and at least one of a prior and a subsequent paper group queue. Based on the specifications of the orders in the current paper group queue, run times are calculated for the orders in the current paper group queue. Slit and score head recovery times are also calculated for the orders in the current paper group queue by comparing the specifications of an order immediately preceding a given order in the current paper group queue with the specifications of an order immediately following the given order in the current paper group queue. The orders in the current paper group queue for which the recovery times exceed the run times are determined and flagged as short orders. For a given short order, pairs of preceding and following orders that would require recovery times less than the given short order's run time are determined and flagged as potential bracketing pairs. The current paper group queue is searched to determine if a bracketing pair can be formed from the orders in the current paper group queue, and if so, the orders in the current paper group queue are reorganized such that one of the orders in the bracketing pair immediately precedes the given short order and the other of the orders in the bracketing pair immediately follows the given short order.

A non-transient computer readable medium programmed with computer readable code that upon execution by a processor causes the processor to execute the method of sorting orders to be run on the multi-section slitter/scorer at a corrugator dry end as described above is also described.

In another example, a method for sorting orders to be run on a multi-section slitter/scorer at a corrugator dry end includes identifying one or more short orders to be run within a current paper group queue. The method includes calculating run times and recovery times for the short orders based upon out configurations of orders immediately preceding and immediately following the short orders, and based upon trim requirements for each of the short orders and the orders preceding and following each of the short orders. The method includes determining for which short orders the recovery time exceeds the run time. For a given short order where the recovery time exceeds the run time, the method includes repositioning orders within the current paper group queue so as to minimize the expected time required to relocate slit and score heads on an unused section of the slitter/scorer from positions required for an order immediately preceding the given short order to positions required for an order immediately following the given short order.

DETAILED DESCRIPTION OF THE DRAWINGS

Figure 8:
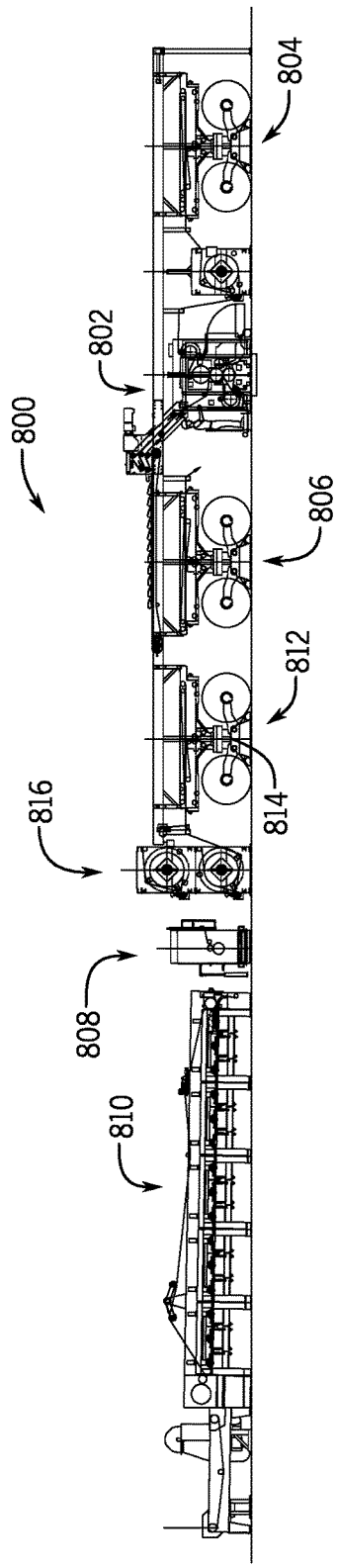
FIG. 8 illustrates one example of a wet end of a corrugator.

A corrugator is comprised of a system of machines that convert rolls of liner and medium papers into a continuous stream of corrugated board that is then slit and cut up into sheets suitable for manufacturing corrugated boxes. The corrugator has a wet end 800 (FIG. 8) with a primary machine known as a singlefacer 802 that makes singleface web from a top liner roll and medium that is fluted within this machine and then glued to the inside surface of the top liner. The top liner and medium are unwound from their roll stands 804, 806, respectively, and spliced at appropriate times to create a continuous process on the wet end of the corrugator. The singleface web is then conveyed to a doublefacer position where it is heated and then run through a glue machine 808 that applies adhesive to the exposed bottom flutes of the singleface web, after which the web enters a doublefacer 810, where it is merged with a bottom liner. The doublefacer 810 includes hot plates forming the width of the corrugator and of variable length where the adhesive is cured, thereby outputting a continuous stream of bonded corrugated board. The bottom liner entering the doublefacer 810 is unwound from a roll stand 812 and run through a splicer 814 in order to maintain continuous flow of web in the event of completion of unwinding of a paper roll chucked up on the roll stand. The bottom liner is then heated on a preheater 816 prior to entering the doublefacer 810 to facilitate the curing of the adhesive on the hot plates.

Figure 9:
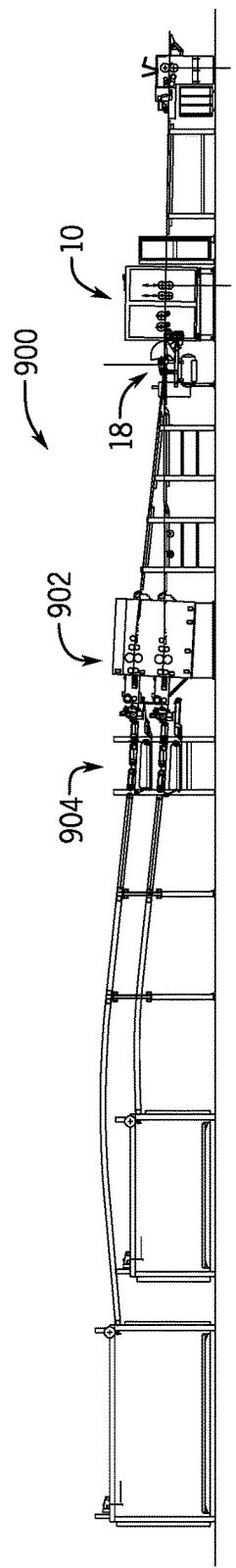
FIG. 9 illustrates one example of a dry end of a corrugator.

After the continuous web of bonded corrugated board exits the doublefacer 810, it enters the dry end 900 of the corrugator (FIG. 9). The function of the dry end is to slit the web of corrugated into individual strips that are then cut to length and stacked according to customers' orders, as required to form individual corrugated boxes, die cut wrappers, or other known applications of individual sheets of corrugated. A key machine of the dry end 900 is the slitter/scorer 10, see also FIG. 1, where the web of corrugated exiting the doublefacer is slit into individual strips and scored with tooling to allow subsequent folding of the corrugated into flaps for boxes that will be created downstream from the corrugator in converting operations. A typical slitter/scorer 10 is comprised of four or more sections, normally with two of the sections operatively engaged with the board to create slits and scores as required for the dry end order being run, while the tooling on the unused section(s) of the slitter/scorer 10 is positioned by robot or other means to prepare for the next order to be run in the dry end order queue. For example, the slitter/scorer 10 shown in FIG. 1 has four sections 12*a*, 12*b*, 14*a*, 14*b* to run continuous back-to-back orders on the dry end of the corrugator in the direction of the arrow. Sections 12*a* and 12*b* are for slits and sections 14*a* and 14*b* are for scores. Normally slit section 12*a* and score section 14*a* will be running an order while robots 22*b*, 24*b* position slit and score heads on the unused slit section 12*b* and score section 14*b*. If a short order is running on sections 12*a* and 14*a*, the head positions on sections 12*b* and 14*b* at the time the short order commenced were associated with the order preceding the short order. "Recovery time" is determined (quantified) by the time it takes for robots 22*b*, 24*b* to reposition the tool heads on sections 12*b* and 14*b* for the order following the short order. After the short order is completed, the following order will then run on sections 12*b* and 14*b* with setup by robots 22*a*, 24*a* on sections 12*a* and 14*a*.

Figure 1:
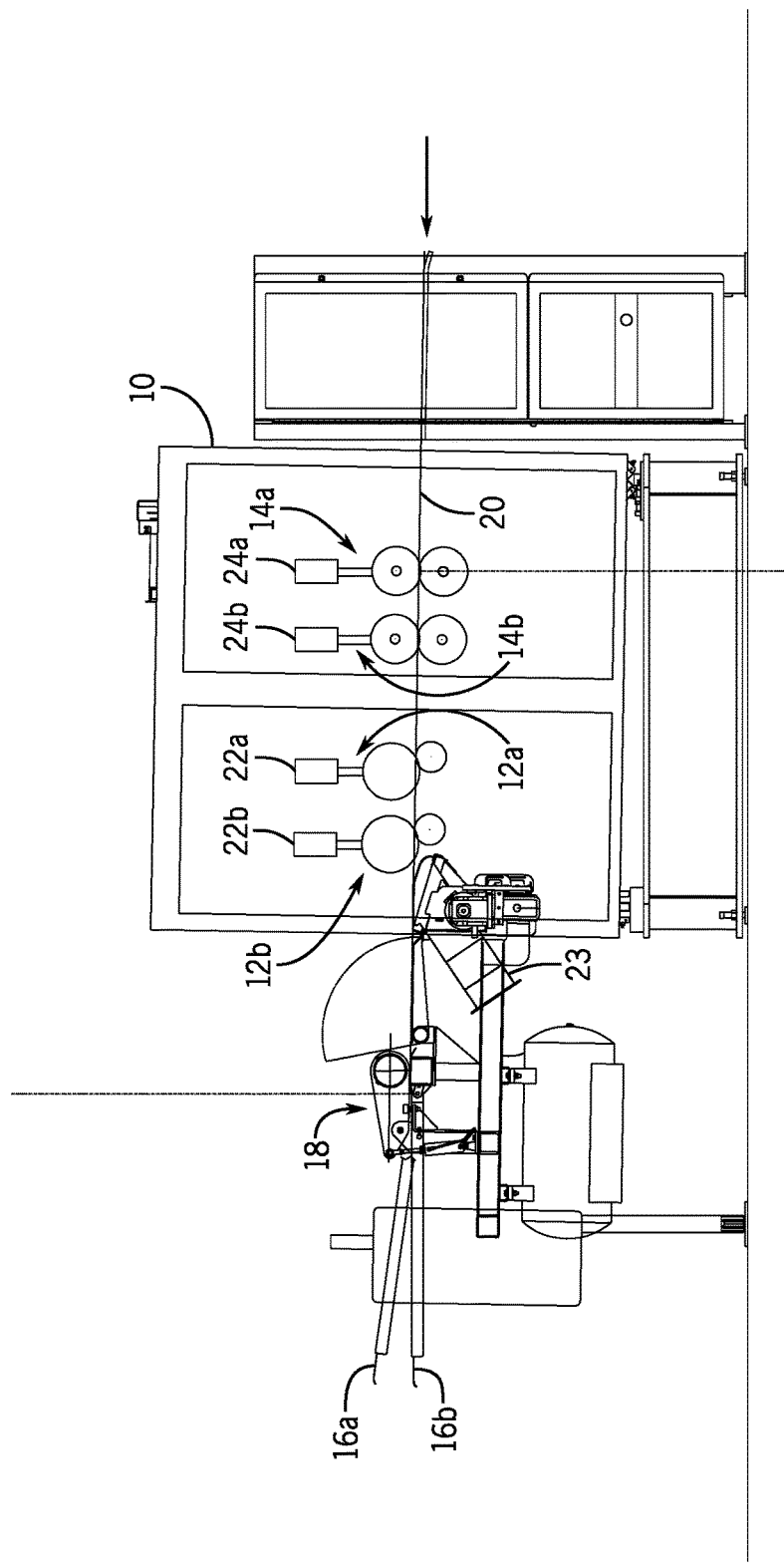
FIG. 1 illustrates a side view of one example of a slitter/scorer at a dry end of a corrugator.

Referring to both FIGS. 1 and 9, the slitter/scorer 10 can create innermost slit(s) that divide the web 20 of corrugated into individual streams of parallel output webs (see, e.g., webs 16*a*, 16*b*) that can be diverted to two or more separate levels of a cutoff knife 902, which then allow the multiple orders to be cut based on length, width, and score positions. The individual streams of corrugated web 16*a*, 16*b* are directed to the appropriate level of the cutoff knife 902 by a web selector table 18. Order changes must be effected while the upstream corrugator wet end (FIG. 8) continues to produce and deliver the continuous web 20 to the slitter/scorer 10. An order change will typically result in a change in widths of the output webs 16*a*, 16*b*; requiring redirection of at least a central portion of the web 20 from one knife level to the other and possibly changes in edge trim widths as well. Downstream of the system shown in FIG. 1, the levels of web 16*a*, 16*b* are then cut by the knife 902 and directed to a stacking system 904 that creates stacks of varying height, depending on the next step in the order process.

The dry end is also capable of continuous operation by programming and machinery that change slitter/scorer tooling positions, web selector table settings, and cut lengths in a gap created in the web 20, which is made by severing the web 20 across the entire width of the corrugator at exit from the doublefacer using a rotary shear, and then allowing the natural over-speed of the dry end pull rolls to tail out the expiring order. Tooling is plunged into the gap in the board line from the unused sections of the slitter/scorer 10 (e.g. sections 12*b*, 14*b*) that have been set up for the next order, while the tooling (e.g. sections 12*a*, 14*a*) from the just-completed order is vertically removed from the web 20 of corrugated. The web selector table 18 forks then reposition to run the new width of orders to their respective knives, and a change of sheet length cut is executed. The stacker then discharges the remaining sheets in the old order while beginning to form up shingles of sheets associated with a new order.

There are other order change methods that do not involve taking advantage of a gap in the web, but for purposes of the present disclosure, they do not change the principles of the systems and methods described herein below. For example, one order change system for corrugator dry ends utilizing double level cut-off knives is known as a "gapless" or "plunge style" order change system, as described in the above-incorporated U.S. Pat. No. 6,117,381. In this type of system, there are two slitter/scorer stations immediately adjacent one another in the direction of web movement and through both of which stations the web travels. At order change, one slitter/scorer, operating on the currently running order, will lift out of operative engagement with the web, and the other slitter/scorer, which is set to the new order alignment, plunges down into operative engagement with the web. The result is a small order change region of corrugated web with overlapping slits and scores for both the running and the new orders.

Corrugators can be programmed to operate according to a particular schedule, in order to achieve objectives such as cost-effectively completing customers' orders. A customer's order usually includes certain specifications, such as but not limited to: the use of certain liners and mediums to provide certain box strength; the width, length, and score tooling positions for the dry end portion of the order; and order quantity (i.e., the number of cuts or sheets in the order). On the wet end of the corrugator, orders are comprised of specific widths and basis weights of papers run at the top liner, medium, and bottom liner roll stand positions. When a customer places an order, specific papers are selected to manufacture the product based upon the specifications of performance regarding a particular strength required by the end use. Normally, many such orders are collected into an order pool, and the job of the corrugated production team is to sort these wet end orders into groups by paper types and basis weights. This job is normally accomplished by one of several software scheduling systems that use algorithms to achieve a wet end schedule that optimizes certain variables. The most commonly used variable of concern is the width of the papers used, which ideally matches the combined width of a set of specific sheets to be run in the order. Any difference in the sum of the widths of the sheets in the orders and the width of the papers comprising the orders is called "trim" and is considered waste in the production process. Papers comprise as much as 75-80% of the cost of corrugated production, so matching papers up within the order pool to minimize trim waste is a goal of many corrugator scheduling systems. Most corrugated plants carry a number of widths of paper to allow the matching of a pool of orders to papers of specific width to minimize trim waste. Additionally, these paper widths are also stocked with various basis weights to allow for matching of the strength requirements of the box with the corrugated board being run. Thus, an initial task of the corrugator scheduling system is to look at the dry end orders in the order pool and combine the orders into groups that can be manufactured from the same paper basis weights, and then match the orders together in specific combinations based on available paper widths so as to minimize trim waste.

There are certain constraints imposed upon the scheduling process that the above-mentioned scheduling algorithms take into consideration. Length of the wet end order is one consideration, because if the wet end orders are too short, there is not time for the wet end operators to chuck up papers for the new order. This is taken into account by limiting minimum length of the wet end orders or by upgrading certain orders to allow them to be run with current papers even though the papers may provide more fiber than the end-use calls for in the specification. Another issue relates to the sequence in which the width of the papers is changed. Normally corrugator operators like to run wider papers first and then narrower papers, so that starch adhesive that may build up on the hot plates in the doublefacer when running the wider paper does not affect the running of narrower paper. When the narrowest paper in the wet end order queue is completed, the corrugator may be stopped and the plates scraped, and the process of wide to narrow started again. Once the scheduling process described above has been completed, the corrugated production team may also choose to make manual adjustments to the schedule based on the geographical location to which orders will be shipped, a customer's timing requirement, or sheet length in order to facilitate stacking of shorter sheets on top of longer sheets.

Approaches to scheduling the corrugator have taken into account the equipment limitations on the dry end of the corrugator only in certain areas. For example, the specific slitter/scorer in use may impose limitations on the width of the minimum trim that can be handled. Sometimes there is a constraint imposed on the minimum length of the order that can be run on the dry end. This is a restriction that is normally based upon the recovery time of the slitter/scorer, as described above. This problem has been handled in the past either by splitting longer orders with short orders, or simply by imposing a minimum order length upon the sales departments, who are not allowed to take orders that cannot be handled by the dry end equipment. Dry end equipment recovery time therefore affects the marketing of the corrugated board and has become a significant problem as the marketplace has evolved. The advent of just-in-time, the development of smaller internet-related businesses that require packaging to fit the task at hand, and the demand for customized printing have resulted in customers placing orders at unpredictable times and in unpredictable (usually smaller) quantities. Thus, recovery time at the dry end is a key factor to be taken into account to allow shorter dry end orders to be run efficiently. However, there are limits on the speed with which robots can reposition tooling on the slitter/scorer.

This new paradigm, in which customers require much shorter orders, has motivated the present inventor to develop a program that will hereinafter be referred to as "schedule optimization sorting" (SOS). SOS provides an overlay to existing scheduling approaches by taking into account constraints of the dry end equipment. Specifically, SOS recognizes when repositioning of tooling on the slitter/scorer is required, determines how long this repositioning will take between particular orders, and re-sorts the already-scheduled orders to minimize dry end recovery time. Thus, SOS takes into account the characteristics and capabilities of a robotic set-up slitter/scorer to modify a schedule for running dry end orders.

The slitter/scorer 10 described herein does not require that slit and score heads be swept by the robots 22a-b, 24a-b to a home position prior to setting them up for a new order after an order change. Instead, the tool heads can be relocated by the robots 22a-b, 24a-b directly from their current position to the new positions required by the next order. As a consequence, if an order that is run prior to a short order has the identical number of outs as the order following the same short order, recovery time to setup the heads is minimal. The robots 22a-b, 24a-b quickly move each tool head the short distance required for the setup. SOS sorts dry end orders within a wet end setup to place orders of the same or nearly the same tooling requirements prior to and after short orders within the dry end schedule to take advantage of the design of the specific slitter/scorer 10 described herein to minimize recovery time. It should be noted that the present methods can be implemented on many different types of corrugators, with many different configurations of robots, slit and score heads, etc. other than the specific example shown herein.

Figure 2:
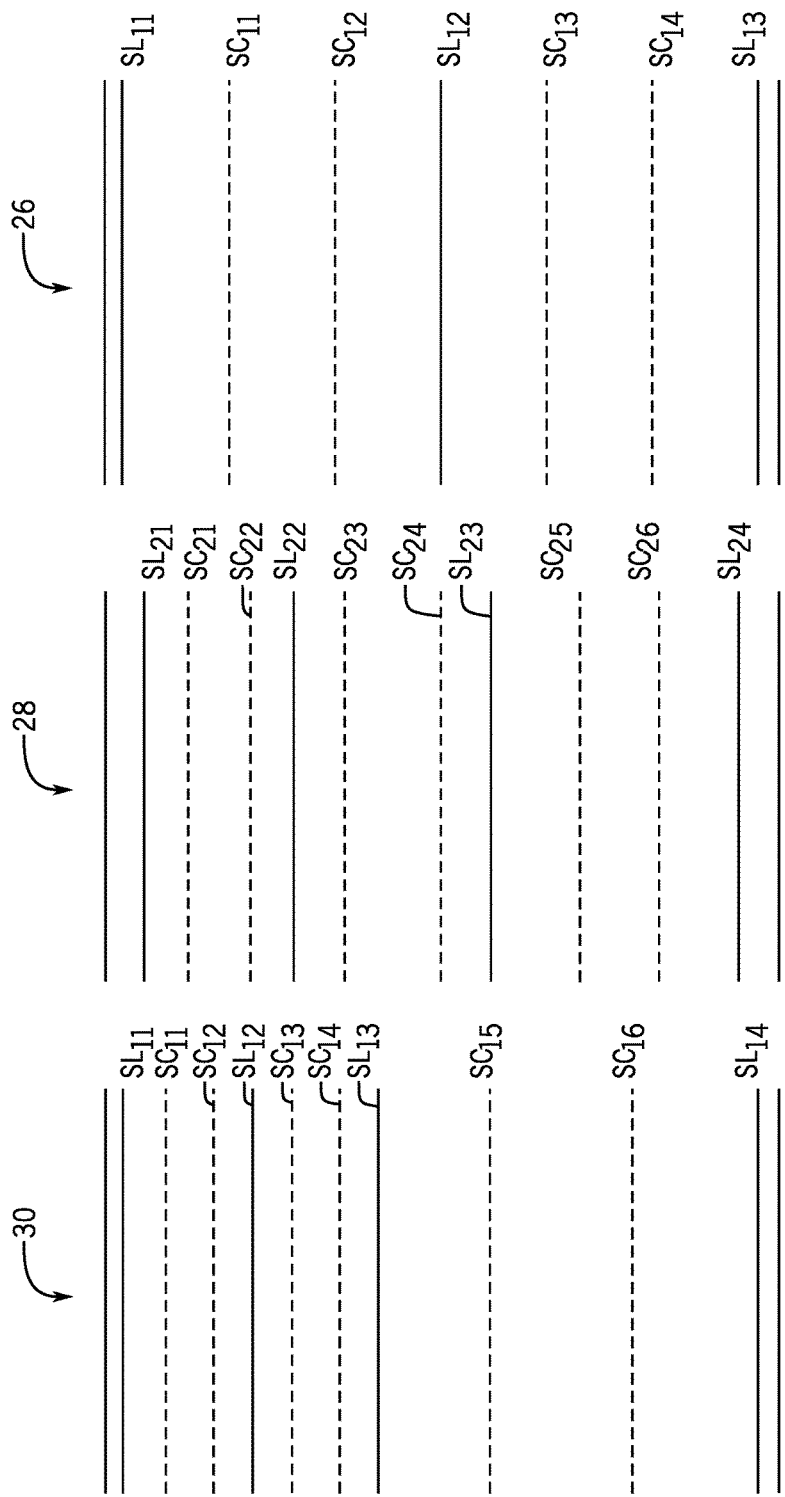
FIG. 2 is a schematic showing a number of slits and scores on an exemplary web.

A top view of one exemplary output of a slitter/scorer is shown in FIG. 2, with score and slit positions shown as dashed and solid lines, respectively, for three orders. The order labeled 26 is the order immediately preceding the running of a current short order, the order labeled 28 is a short order, and the order labeled 30 is the order immediately following the short order 28. The function of the robots setting up the tooling on the slitter/scorer 10 is to move the tools from previous positions for the order 26 preceding the short order 28, to subsequent positions required for the order 30 following the short order 28. Comparing for now just the score tool positions for the preceding order 26 and following order 30, there are four score lines ($SC_{11}$, $SC_{12}$, $SC_{13}$, $SC_{14}$) on the preceding order 26, and six score lines ($SC_{11}$, $SC_{12}$, $SC_{13}$, $SC_{14}$, $SC_{15}$, $SC_{16}$) on the following order 30. Referring to both FIGS. 1 and 2, orders 26 and 30 are carried out by sections 12b, 14b and order 28 is carried out by sections 12a, 14a. While the current order 28 was running on sections 12a, 14a, the robot 24b had to bring two additional score tools out onto the board line at section 14b in preparation for making score lines $SC_{15}$, $SC_{16}$ for the following order 30. In addition, the robot 24b had to move four score tools with respect to the board line to prepare for making scores $SC_{11}$, $SC_{12}$, $SC_{13}$, $SC_{14}$ in the following order 30. Only the scores have been discussed so far, but the unused slit tool robot 22b also had to move two slit tools and add a fourth slit tool as well while the current short order 28 was running. By examining FIG. 2, it is clear that more tools are required to form the slits and scores for the order 30 following the short order 28 than for the order 26 preceding the short order 28. In this example, the robot 24b moving score tools on section 14b had to touch and move six score tools a substantial distance, requiring a relatively large recovery time.

Figure 3:
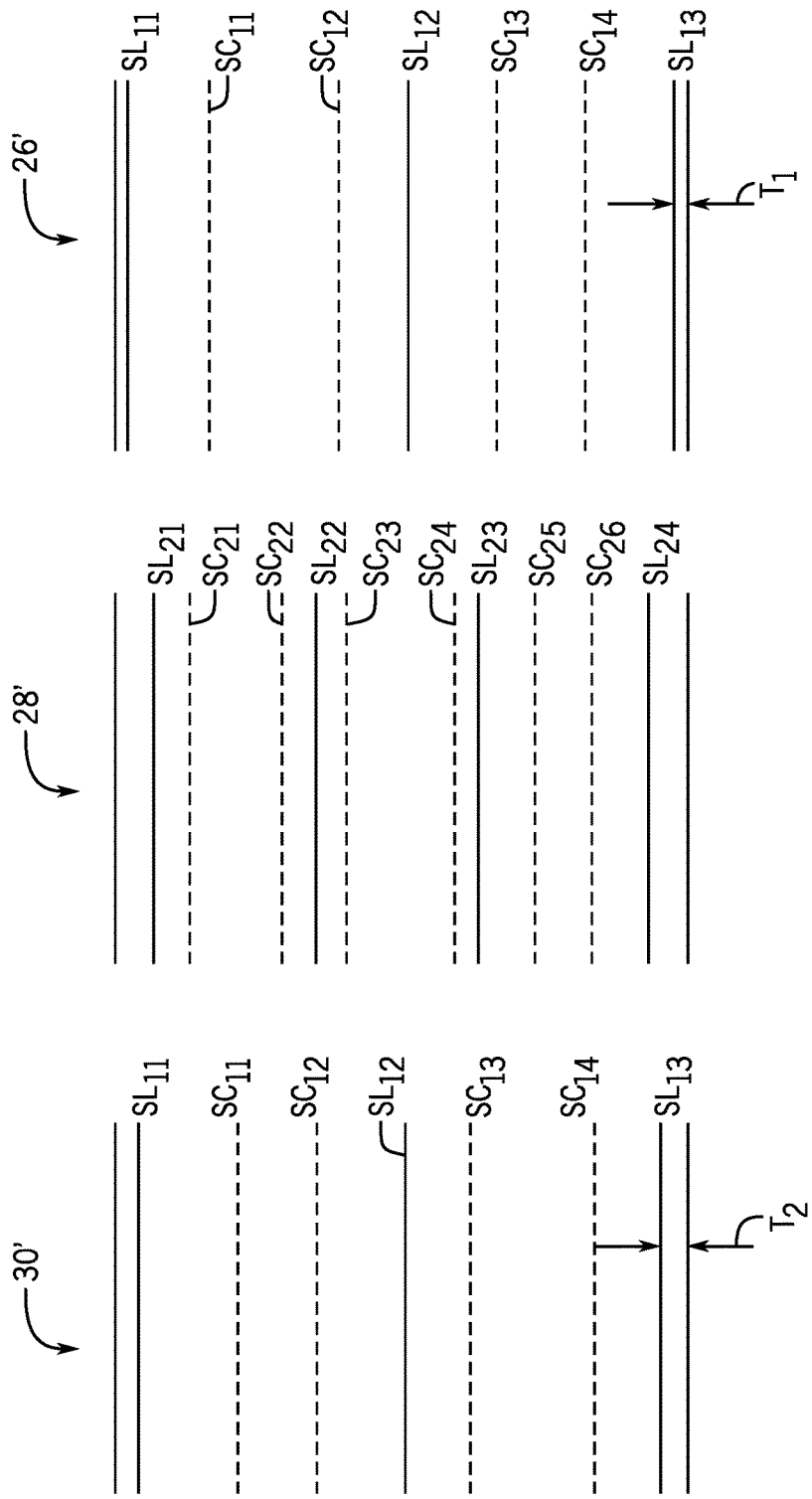
FIG. 3 is a schematic showing different slits and scores on another exemplary web.

A top view of another exemplary output of a slitter/scorer is shown in FIG. 3. However, in this sequence, the number of tools required for the order 30' following the short order 28' is the same as the number of tools required for the order 26' preceding the short order 28', and the tools are in nearly the same positions in both the preceding and following orders. In this case, recovery time is much less than that for the situation shown in FIG. 2, because the robots 22b, 24b have to move fewer tools a smaller distance. Comparing the slit and score tool positions for the preceding order 26' and following order 30', it is seen that the same number of tools were patterned to create the slit and score lines. Slit tool $SL_{12}$ stayed on the same pathway, requiring no movement by the robot 22b. Slit tools $SL_{11}$ and $SL_{12}$ were moved a very small distance to accommodate the difference in trim width between the preceding and following orders (compare trim T1 with trim T2). Score tool sets $SC_{11}$, $SC_{12}$ and $SC_{13}$, $SC_{14}$ were also moved a small distance to reflect the differences in the flap scores for the preceding and following orders. In this example, the robot 24b on the score side had to pick up and move only four tools a small distance. Again, the time it takes to set up these tools is a function of how many tools the robots had to move and the distance of each move. Since the number of tools and total distance moved are less than that of the situation in FIG. 2, it is clear that recovery time for the situation in FIG. 3 is much shorter than for the situation in FIG. 2.

Figures 4, 5:
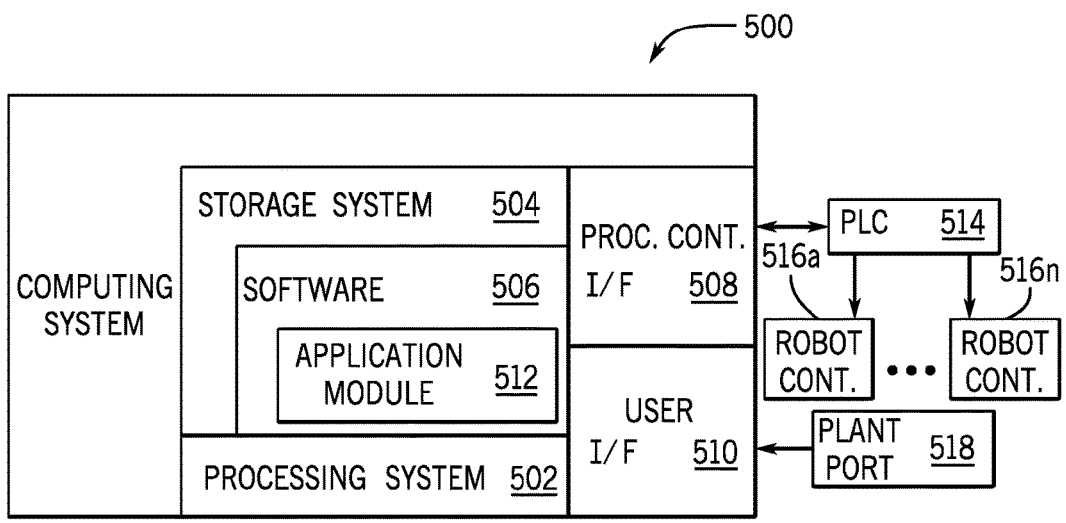
FIG. 4 illustrates one exemplary table to for calculating recovery times for a slitter/scorer having eight outs or fewer.
FIG. 5 is a schematic showing a system for carrying out the methods described herein.

This concept motivated the idea of sorting orders within a paper group (e.g., a specific choice of paper basis weight and width) for purposes of minimizing dry end recovery time. If moving orders around within a paper group is acceptable for a particular schedule, then relocating short orders between two other orders that have the same or similar number of outs (which requires very little repositioning of slit tools while the short order is running, as seen in FIG. 3) is a means of optimizing run speeds for these short orders, which would otherwise need to be run at a slower speed to allow for sufficient recovery time. By bracketing orders with the same number of outs around a short order, SOS minimizes recovery time, as can be seen by analyzing the table provided in FIG. 4. Note that this table is symmetric regarding recovery times in the lower right corner, but such times have been left out for ease of reading the table. The table of FIG. 4 is a matrix that can be used to compute recovery times for certain order configurations taking into consideration the number of outs in the order preceding a current running order and the number of outs in the order following the current running order. The data presented in the table is actual test data taken while observing a slitter/scorer, and is provided for exemplary purposes only. Other slitter/scorers, having different tool arrangements, different numbers/types of robots, and/or various other differences in machinery, would produce different test data. However, the principles described with respect to the table shown in FIG. 4, and the application of the SOS method to this data, applies to all multi-station slitter/scorers, not just the one shown in FIG. 1 or tested to create the table of FIG. 4.

The columns of the table represent possible out patterns for the order preceding the currently running order, and the rows of the table represent possible out patterns for the order following the current running order. For example, if one wanted to determine the recovery time for an order where the preceding order was a four-out and the following order was a two-out, one would start at the column for a four-out and go down to the cell that intersects the row for a two-out. This cell would provide a recovery time of 19 seconds, as shown by the circle. Looking at the table, it can be seen that a minimum recovery time is achieved when the number of outs on the preceding order and the following order are identical. Compare, for example, the recovery time for a four-out by four-out case (13 seconds) with the recovery time for a four-out by five-out case (19 seconds) or a five-out by four-out case (also 19 seconds). This minimum recovery time occurs because no extra heads (scores or slits) are required to be brought out over the board line to setup for the following order. When the number of outs is the same, tool heads normally only need to be moved a short distance from their current setup position to the new setup position. This is confirmed by the examples of FIGS. 2 and 3 above, wherein the recovery time for the sequence of FIG. 2, having two outs in preceding order 26 and three outs in following order 30, is greater than the recovery time for the sequence of FIG. 3, having two outs in the preceding order 26' and two outs in the following order 30'.

The SOS task then becomes one of (1) finding two orders within a paper group that have the same or similar number of outs, (2) relocating these orders within the paper group to follow each other, and (3) inserting an identified short order to a position between these two orders with the same/similar number of outs. The SOS process may be carried out by a system such as that shown in FIG. 5, which shows a diagram of an exemplary embodiment of a system 500 for sorting orders to be run on a multi-section slitter/scorer 10 at a corrugator dry end. The system 500 is generally a computing system that includes processing system 502, storage system 504, software 506, and interfaces such as a corrugator process controller interface 508 and a user interface 510. The processing system 502 loads and executes software 506 from the storage system 504, including a software application module 512. When executed by the computing system 500, application module 512 directs the processing system 502 to operate as described herein in further detail to execute the SOS method.

Although the computing system 500 as depicted in FIG. 5 includes one application module 512 in the present example, it should be understood that one or more modules may provide the same operation. Similarly, while the description provided herein refers to a computing system 500 and a processing system 502, it is to be recognized that implementations of such systems can be performed using one or more processors, which may be communicatively connected, and such implementations are considered to be within the scope of the description. The processing system 502 can comprise a microprocessor and other circuitry that retrieves and executes software 506 from storage system 504. Processing system 502 can be implemented within a single processing device but can also be distributed across multiple processing devices or sub-systems that cooperate in existing program instructions. Examples of processing system 502 include general purpose central processing units, applications specific processors, and logic devices, as well as any other type of processing device, combinations of processing devices, or variations thereof.

The storage system 504 can comprise any storage media readable by processing system 502, and capable of storing software 506. The storage system 504 can include volatile and non-volatile, removable and non-removable media implemented in any method or technology for storage of information, such as computer readable instructions, data structures, program modules, or other data. Storage system 504 can be implemented as a single storage device but may also be implemented across multiple storage devices or sub-systems. Storage system 504 can further include additional elements, such as a controller capable of communicating with the processing system 502. Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media a propagated signal.

Corrugator process controller interface 508 provides a hardwired or wireless link to one or more corrugator programmable logic controllers (PLCs) 514. The PLCs 514 carry out many functions of the corrugator, including but not limited to communicating with one or more robot controllers 516a . . . n, which control movement of the one or more robots 22a-b, 24a-b that move the score and slit tool heads as described herein above.

User interface 510 can include a mouse, a keyboard, a voice input device, a touch input device, and other comparable input devices and associated processing elements capable of receiving user input from a user. Output devices such as a video display or graphical display can display an interface further associated with embodiments of the system and method as disclosed herein. Speakers, printers, and other types of output devices may also be included in the user interface 510. The user interface 510 may also be linked to a plant port 518, via which the corrugator operator can download a pre-defined cut list schedule from the production office.

Figure 6:
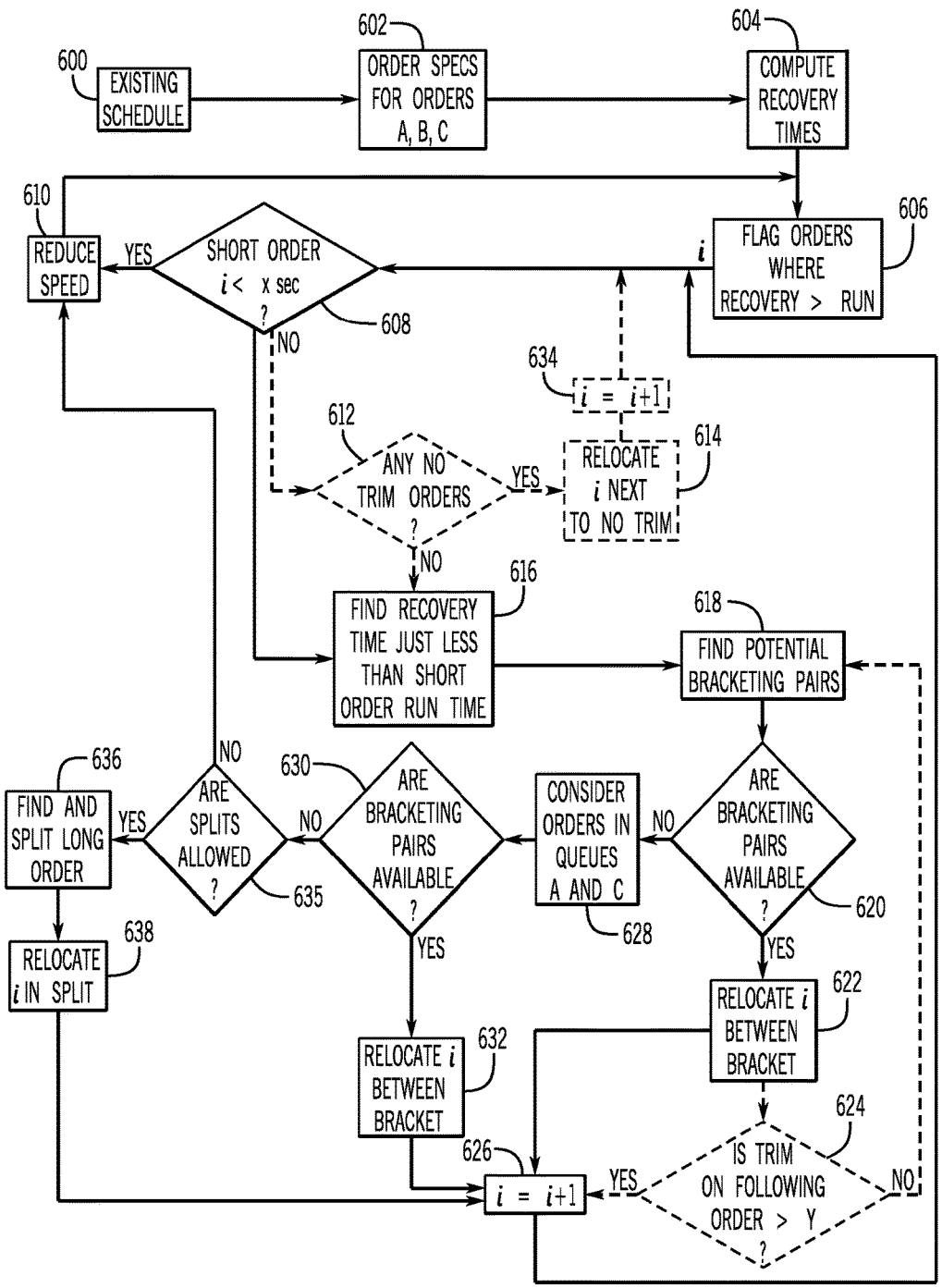
FIG. 6 is a flowchart showing one example of a method for carrying out the present disclosure.

In one example, the software application module operates in order to carry out the method shown in FIG. 6. As shown at 600, the method includes accepting an input of a pre-defined cut list schedule, such as one created by any of the scheduling software described herein above or downloaded via the link to the plant port 518. This pre-defined schedule includes information about the order and contents of different paper groups, and includes for example paper group queues A, B, and C, which have been sorted and scheduled based on a plurality of customer orders according to paper basis weight and paper dimensionality prior to execution of the remainder of the method. For purposes of explaining the example of FIG. 6, paper group queue A will be the prior paper group queue, paper group queue B will be the current paper group queue, and paper group C will be the subsequent paper group queue. It should be understood that in reality many more paper group queues exist in a cut list, but the entire schedule can be analyzed and reorganized by studying only three paper group queues at a time, as will be described herein below. Each paper group queue A, B, and C includes a number of orders. Each paper group queue A, B, or C is analyzed separately (at least initially) for purposes of re-ordering the orders within the respective queue to minimize dry end recovery time. Within each paper group queue, there exist many preceding, current, and following orders (see FIGS. 2 and 3), some or all of which are also analyzed in groups of three. The SOS algorithm begins with the first paper group in the cut list and proceeds down the cut list through the second, third, etc. paper groups. The paper group currently being analyzed is considered to be the "current" paper group, and will change as each succeeding paper group queue in the cut list is analyzed.

As shown at 602, the method includes collecting specifications of orders in a current paper group queue and at least one of a prior and a subsequent paper group queue. In the present example, several specifications for each paper group queue A, B, C are retrieved from the storage system 504, manually input via the user interface 510, or downloaded via the link to the plant port 518. These specifications may comprise one or more of a length of each order in each paper group A, B, or C, a number of outs of each order, a position of the outs on the board line, a trim of each order, and a desired run speed of the slitter/scorer. Other specifications may be used in order to better approximate the run or recovery time of a given order, and the above-mentioned specifications are not limiting on the scope of the present disclosure.

Next, as shown at 604, the method includes calculating run times for the orders in the current paper group queue B based on the specifications, and calculating slit and score head recovery times for the orders in the current paper group queue B by comparing specifications of an order immediately preceding a given order in the current paper group queue with specifications of an order immediately following the given order in the current paper group queue. In the present example, the run times and recovery times for each of the orders in each of the paper group queues A, B, C are determined. The run times may be approximated by using the length and desired run speed for each order. The recovery times may be approximated by inputting the number of outs in the orders immediately preceding and following the current order into the table shown in FIG. 4, or into a similar list of measured recovery times for the particular corrugator on which the program is to be run. Alternatively, the number of outs, slits, and scores; the trim width; and the average speed of the robot can be used to provide an approximation of recovery times. These approximations can then be updated with real-time information as the corrugator is run, and the stored recovery times therefore brought closer to their actual values over time.

A next step in the SOS process is for the computing system to identify and flag short orders. One method for determining which orders are short orders is to determine for every order in the current queue whether its recovery time exceeds its run time. For example, as shown at 606, the method includes determining for which orders in the current paper group queue the recovery times exceed the run times, and flagging these orders as short orders. However, an alternative method is to analyze only orders that are less than a particular length to determine if their recovery time exceeds their run time. Depending on the number of orders to be processed, this initial step may significantly reduce the computing time to determine and flag short orders. Therefore, a step may be inserted anywhere between 602 and 606, which includes determining which orders in the current paper group have a run time of less than a first value, and computing run times and recovery times for only those orders having the run time of less than the first value. The first value can be any value chosen by the corrugator scheduler, or pre-programmed into the application's software. In one example, the first value is a value between thirty seconds and one minute, although other values could be used. For example, the algorithm may analyze only those orders that are scheduled to run in less than thirty seconds to determine if the recovery time exceeds the run time. However, it should be noted that recovery times for certain orders could be longer than this, as noted in the table of FIG. 4. For example, for a six-out slitter/scorer, orders running six outs still need to be analyzed relative to recovery times over thirty seconds.

After flagging short orders, SOS then analyzes each flagged short order in turn. The shortest orders within a paper group may be analyzed first. For each short order (i), the method moves to decision block 608, where it is determined if the run time for the given short order is less than a second value (here, "x seconds"). The second value may be equal to the shortest possible time it takes for slit and score heads on the slitter/scorer 10 to be relocated from positions required for an order immediately preceding the given short order (i) to positions required for an order immediately following the given short order. In other words, the determination made at 608 is whether the run time for a short order is shorter than any possible recovery time, in which case reorganizing the orders will not result in eliminating the need to slow the machine's speed. In the case where the short order's run time is less than the second value, the method includes providing an instruction to run the corrugator at a slower speed (see 610) such that the run time for the given short order does not exceed a calculated recovery time for slit and score heads on the slitter/scorer to be relocated from positions required for an order immediately preceding the given short order to positions required for an order immediately following the given short order. The second value may be a shortest possible time it takes for the slit and score heads to be relocated from positions required for the order immediately preceding a given order to positions required for the order immediately following a given order, provided that a number of outs of each of the preceding and following orders is the same. In one example, the second value is eleven seconds, which, from examination of the table in FIG. 4, can be seen is the shortest recovery time available for the particular slitter/scorer that was tested, and is achievable when bracketed by orders having one out each.

If the corrugator's speed is reduced, the method then returns to 606, where it is determined for which orders the recovery time exceeds the new, slower run times. The determination at 608 is subsequently repeated to ensure the slower speed of the corrugator has provided adequate recovery time. The amount by which the corrugator's speed is reduced could be a pre-determined amount that is independent of the short order's run time. Alternatively, the amount by which the speed is reduced could be calculated so as to ensure that the new, slower run time for the short order is greater than or equal to the second value. The corrugator's speed may be maintained at the slower speed for all of the orders in a paper group, or if there are very few times when speed needs to be reduced, the corrugator's speed may be reduced for just the particular short order(s) that necessitated the slower speed in the first place. In the latter instance, all short orders for which speed needs to be reduced can be scheduled at the beginning or end of a paper group (separated from one another by long orders if necessary) so as to prevent repetitive acceleration and deceleration of the corrugator.

If the short order is greater than the second value, the method may continue to decision block 612, where it is determined whether there are any no-trim orders in the current paper group B. If SOS has identified no-trim orders within the current paper group B, it may reorganize the orders in the current paper group queue such that the no-trim order immediately follows the given short order, as shown at 614. Alternatively, SOS may search for a no-trim order in the following paper group C, relocate this order to the beginning of the following paper group C, and place the flagged short order at the end of its paper group B. Because a no-trim order usually requires less tool head set-up than an order requiring trim, the recovery time for the tool heads to set up in a no-trim position may be less than the run time of the short order. This is especially true if the slitter/scorer is one like that shown and described in U.S. Pat. No. 8,267,847, which slitter/scorer requires slightly more time to set up for an order with trim than for a no-trim order. The steps shown at 612 and 614 are optional, and the method may instead continue directly from 608 to 616, where it includes determining which recovery times are just less than the flagged short order's run time. This may be done by accessing a list or a table such as that shown in FIG. 4. As a specific example, if the short order has a run time of 17.8 seconds, the method may include determining that 17 seconds is the just-shorter recovery time.

Once the just-shorter recovery time has been determined, the method includes determining pairs of preceding and following orders that would require recovery times less than the given short order's run time, and flagging these as potential bracketing pairs, as shown at 618. By way of example, if the flagged short order is greater than or equal to 11 seconds, but less than 13 seconds, then it can be bracketed by two, one-out orders (see col. 1, row 1). If flagged orders are equal to or greater than 13 seconds but less than 17 seconds, they can be bracketed by one-out, two-out, three-out, or four-out orders (again, see the table in FIG. 4). If flagged short orders are less than or equal to 19 seconds, then they can be run if they are bracketed by orders of the same number of outs for six-outs or less, or by 5×4, 4×3, 4×2, 3×2, or 2×1 orders. Using the specific example for a short order of 17.8 seconds, the potential bracketing pairs are those with recovery times of 17, 14, 13, or 11 seconds in the table of FIG. 4. In one example, the potential bracketing pairs comprise pairs of preceding and following orders having the same number of outs; however, any pairs of preceding and following orders with recovery times less than the short order's run time are suitable, even if the orders do not have the exact same number of outs.

The method then continues to 620, where it includes searching the current paper group queue B to determine if a bracketing pair can be formed from the orders in the current paper group queue B. For example, if the flagged short order is less than or equal to 19 seconds, SOS may proceed to identify out patterns of the current paper group queue to find two orders with similar outs of six-outs or less. If so, the method includes reorganizing the orders in the current paper group queue B such that one of the orders in the bracketing pair immediately precedes the given short order and the other of the orders in the bracketing pair immediately follows the given short order, as shown at 622. Thus, the given short order has been re-scheduled such that it will be run between a pair of orders that have a recovery time that is less than the short order's run time. The method may then move to analyzing the next flagged short order (i=i+1) in the current paper group (see 626), and return to the decision made at 608 for this next short order. The steps of determining the potential bracketing pairs and searching the current paper group queue to determine if a bracketing pair can be formed are thus repeated for each order that has been flagged as a short order.

The method may alternatively include determining if a trim on the order immediately following the given short order exceeds a certain width (here, "y"), as shown at 624. If not, the method may return to 618 and then 620, where it includes searching the current paper group queue B again to determine if a different bracketing pair can be formed from the orders in the current paper group queue B. This optional process may be iterated until a trim on the following order exceeds the certain width, after which the method may move to analyzing the next flagged short order in the current paper group (see 626). Analysis of the trim width may be included because some slitter/scorers require trim from the interior slit section to be shoved across the external slit section for every other order. To minimize the potential of a trim jam, SOS may position short orders in the order queue so that the order following the short order will have wider trim that will be easier to guide over the exterior slit section. Thus, if a short order is run on the internal slit section, it will not be necessary to guide the trim for the following order across the external trim section to the downstream trim chutes (see FIG. 1 at 23). This will happen roughly 50% of the time on a random basis. If the slit section to run the short order were known, then the following order could be run on the external slit section. In one example, an approximation of a trim width that is likely to be greater than a short order's trim width is made and set as the certain width. In one example, the certain width is 50 mm, but a different width may be chosen. Alternatively, the actual trim width of a given short order can be taken into account, and an order with a known actual trim width that is wider can be scheduled to run after the short order.

There are some nuances to the SOS algorithm that prompt consideration of orders within the paper groups that precede or follow the paper group being analyzed for order sorting (i.e., the current paper group). For example, it may be that there are no orders with a common number of outs within a given paper group, or for which a recovery time is greater than the given short order's run time. It is still possible to bracket a short order between two orders that have the same or similar number of outs by relocating the short order as the first order to be run within its paper group and then positioning an order from the prior paper group at the end of its group to create a bracket with another order within the current paper group. One could also move the short order to the end of its paper group and relocate an order within the subsequent paper group to the first-to-run position within its group. The SOS algorithm therefore looks at orders within a current paper group as well as orders in prior and subsequent paper groups to sort out and bracket short orders with preceding and following orders of equal or similar numbers of outs. Therefore, if a bracketing pair cannot be formed from orders in the current paper group B as determined at 620, the method further comprises searching at least one of the prior and subsequent paper group queues (A and/or C) as shown at 628 to determine if a bracketing pair can be formed from an order in the current paper group queue B and an order in the at least one of the prior and subsequent paper group queues (A or C), as shown at 630. If so, as shown at 632, the method includes reorganizing the orders in at least one of the current, prior, and subsequent paper group queues (B, A, and/or C) such that one of the orders in the bracketing pair immediately precedes the given short order (i) and the other of the orders in the bracketing pair immediately follows the given short order. Thus, the bracketing pair can be formed from one order within the current paper group queue B and one order outside of the current paper group queue B. The method then continues to analyze the next short order, as shown at 626.

If a bracketing pair cannot be formed from orders in the current paper group queue B or from orders in the current paper group queue B and the one of the prior and subsequent paper group queues (A or C), i.e. the determination at 630 is "no," an alternative to the above scheduling options would be to split a longer order into two orders. As shown at 635, a determination is made as to whether split orders are allowed. Whether a split order is allowed may depend on the type of conveying system being used. For example, if the conveying system is not capable of shunting out a short order into a separate stack and returning back to stacking a split long order, then a split might not be allowed. If splits are allowed, the method includes finding and splitting a long order (see 636) and inserting the short order between the two segments of the longer order (see 638). Since no scores or slits would have to be repositioned after completion of the short order, recovery time for the slit and score heads could potentially be less than 10 seconds. Referring to the table of FIG. 4, this provides one example of a solution for running short orders of under 17 seconds and down to 10 seconds with the slitter/scorer. This portion of the method therefore comprises reorganizing the first paper group queue B such that the given short order is scheduled to split a long order into two shorter segments. The method then continues to analyze the next short order, as shown at 626. If splits are not allowed, the method continues to 610, and the corrugator's speed is reduced as discussed herein above.

Referring to both FIGS. 5 and 6, the present disclosure also includes a non-transient computer readable medium 504 programmed with computer readable code that upon execution by a processor 502 causes the processor 502 to execute a method of sorting orders to be run on a multi-section slitter/scorer at a corrugator dry end, which method has been described herein above.

Figure 7:
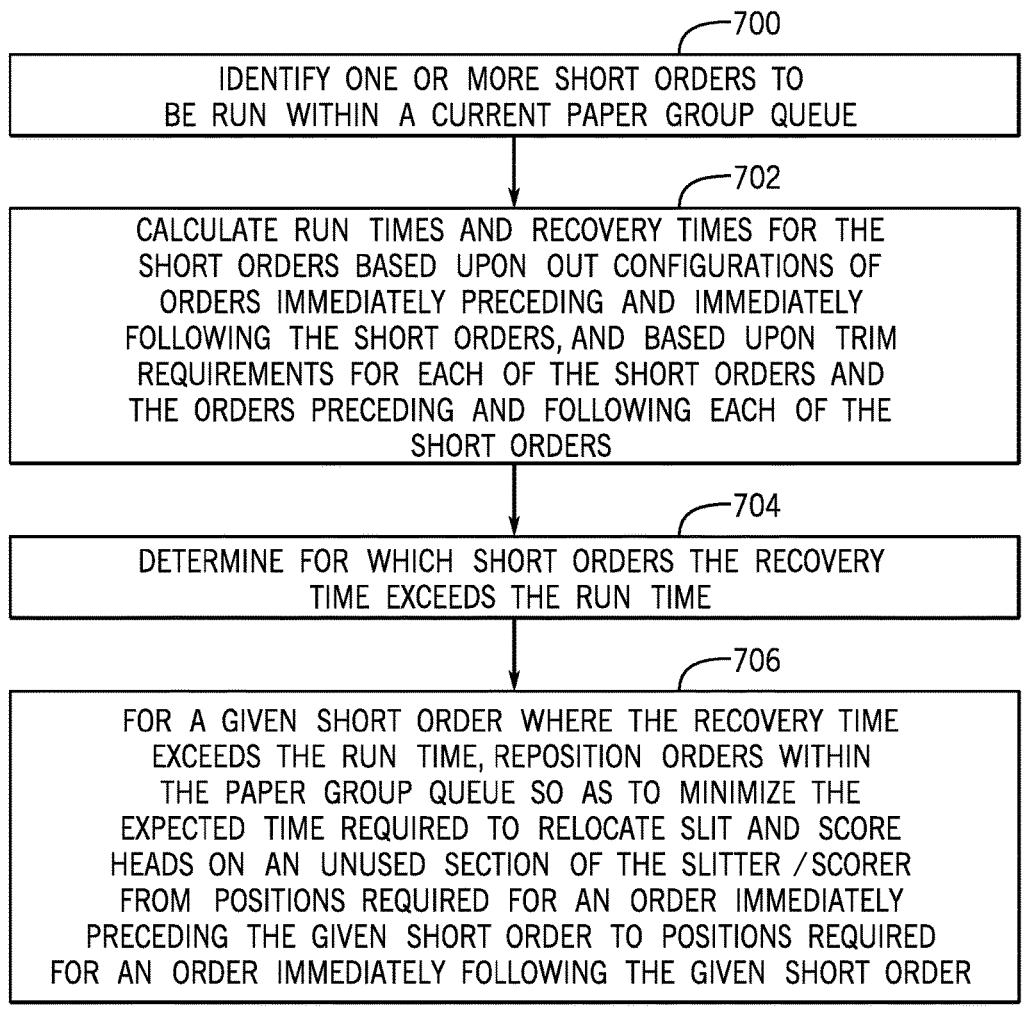
FIG. 7 is a flowchart showing another example of a method for carrying out the present disclosure.

Turning to FIG. 7, an alternative method for sorting orders to be run on a multi-section slitter/scorer at a corrugator dry end will be described. As shown at 700, the method includes identifying one or more short orders to be run within a current paper group queue. As mentioned above, a short-cut for doing so is to determine which orders have a run time of less than a certain value. As shown at 702, the method next includes calculating run times and recovery times for the short orders based upon out configurations of orders immediately preceding and immediately following the short orders, and based upon trim requirements for each of the short orders and the orders preceding and following each of the short orders. As mentioned above, the recovery times can be calculated by using a look-up table stored in the storage system 504, such as the table of FIG. 4. Recovery times could alternatively be determined from a list of preceding and following out configurations and their associated recovery times. The algorithm looks at the order preceding the flagged short order and the order following the short order and calculates the recovery time based on the number of outs in each of the preceding and following orders. After this, the algorithm determines for which short orders the recovery time exceeds the run time, as shown at 704.

As shown at 706, for a given short order where the recovery time exceeds the run time, the algorithm repositions orders within the paper group queue so as to minimize the expected time required to relocate slit and score heads on an unused section of the slitter/scorer from positions required for an order immediately preceding the given short order to positions required for an order immediately following the given short order. If possible, SOS reorganizes orders in the current paper group queue so the order immediately preceding or following the given short order does not require trim, thereby decreasing a number of slit heads that need to be moved to recover during the given short order, and locates an order with the same number of outs as the no-trim order to bracket the flagged short order. If SOS cannot locate a no-trim order, then it will reorganize orders in the current paper group queue so that a number of outs in the order immediately preceding the given short order is the same as a number of outs in the order immediately following the given short order. SOS may also attempt to have the following order be one with wider trim to maximize the potential for trim pick up without a jam when recovery proceeds. If SOS cannot find a no-trim order and/or bracket the short order with other orders with an equal number of outs, SOS looks for preceding and following orders having a recovery time that is less than the run time of the short order, even if the number of outs is not the same. If, within the current paper group, SOS cannot find a no-trim order and/or bracket the short order with orders having a recovery time shorter than the short order's run time, SOS may reorganize the orders in one or both of the current paper group queue and a prior or subsequent paper group queue so that a number of outs in the order immediately preceding the given short order is the same as a number of outs in the order immediately following the given short order. If none of these attempts are successful, then the short order may be run at slower speed to achieve adequate time for order recovery. Once all paper group queues, including the prior, current, and subsequent paper group queues, have been analyzed and possibly reorganized, the new cut list is sent to a corrugator process controller 514.

EXAMPLES

Figure 10:
FIGS. 10-12 illustrate various examples of re-organizing of orders in a cut list.
Figure 11:
Figure 12:

FIGS. 10-12 and the following paragraphs illustrate some principles of SOS through examples. These examples were taken from a cut list from an operating corrugated plant. The data extracted from the cut list shows the sequential order numbers, the order lengths, the number of outs for each order, the trim widths and the run times, as well as the recovery times for the shortest orders. Individual paper groups are delineated by the horizontal lines in the data shown in FIGS. 10-12. In the first part of each example, problems in the form of recovery times exceeding run times or narrow trim issues are shown in boxes. The SOS solutions are described and the reorganized schedules are shown:

Example 1.0 is shown in FIG. 10.

As shown in the original list (top), recovery time on short order 136 exceeds the run time as scheduled. Because the run time is 16 seconds, this order is bracketed by orders with the same number of outs. As shown in the resulting reorganized list (bottom), SOS will switch orders 134 and 135 to bracket short order 136 with orders of the same number of outs.

Example 2.0 is shown in FIG. 11.

In the original list (top), for order 204, recovery time exceeds runtime. Additionally, order 205 has narrower trim than order 204, which could cause trim jam. As shown in the reorganized list (bottom), SOS will move order 204 to the end of its paper group and move order 202 to position above 204 to bracket 204 with the same number of outs. SOS will also move order 207 to the beginning of its paper group so trim at recovery is wider.

Example 3.0 is shown in FIG. 12.

As shown in the original list (top), trim for order 192 is narrower than for order 191, which may be problematic. As shown in the reorganized list (bottom), SOS will move order 191 to the end of its paper group so the order following short order 191 can have wider trim. To achieve this, SOS will also move order 195 to the top of its paper group.

In the present description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. Each limitation in the appended claims is intended to invoke interpretation under 35 U.S.C. §112(f), only if the terms "means for" or "step for" are explicitly recited in the respective limitation.

What is claimed is:

1. A method for sorting orders to be run on a multi-section slitter/scorer at a corrugator dry end, the method being carried out by a processor and comprising:
collecting specifications of orders in a current paper group queue and at least one of a prior and a subsequent paper group queue;
based on the specifications of the orders in the current paper group queue, calculating run times for the orders in the current paper group queue;
calculating slit and score head recovery times for the orders in the current paper group queue by comparing the specifications of an order immediately preceding a given order in the current paper group queue with the specifications of an order immediately following the given order in the current paper group queue;
determining for which orders in the current paper group queue the slit and score head recovery times exceed the run times, and flagging these orders as short orders;
for a given short order, determining pairs of preceding and following orders that would require recovery times less than the given short order's run time, and flagging these as potential bracketing pairs;
searching the current paper group queue to determine if a bracketing pair can be formed from the orders in the current paper group queue, and if so, reorganizing the orders in the current paper group queue such that one of the orders in the bracketing pair immediately precedes the given short order and the other of the orders in the bracketing pair immediately follows the given short order; and
outputting a cut list including the reorganized orders in the current paper group queue to a controller, which thereafter controls at least one robot that positions slit and score heads on the slitter/scorer according to specifications of orders in the cut list.

2. The method of claim 1, wherein if a bracketing pair cannot be formed from the orders in the current paper group, the method further comprises searching the at least one of the prior and subsequent paper group queues to determine if a bracketing pair can be formed from an order in the current paper group queue and an order in the at least one of the prior and subsequent paper group queues, and if so, reorganizing the orders in at least one of the current, prior, and subsequent paper group queues such that one of the orders in the bracketing pair immediately precedes the given short order and the other of the orders in the bracketing pair immediately follows the given short order.

3. The method of claim 2, wherein if a bracketing pair cannot be formed from the orders in the current paper group queue or from the orders in the current paper group queue and the one of the prior and subsequent paper group queues, the method further comprises reorganizing the current paper group queue such that the given short order is scheduled to split a long order into two shorter segments.

4. The method of claim 2, wherein the potential bracketing pairs comprise pairs of preceding and following orders having the same number of outs.

5. The method of claim 1, further comprising determining which orders in the current paper group queue have a run time of less than a first value, and computing run times and recovery times for only the orders having the run time of less than the first value.

6. The method of claim 5, further comprising determining if the run time for the given short order is less than a second value, and if so, instead of searching for the potential bracketing pairs, providing an instruction to run the slitter/scorer at a slower speed such that the run time for the given short order does not exceed a calculated recovery time for the slit and score heads to be relocated from positions required for an order immediately preceding the given short order to positions required for an order immediately following the given short order.

7. The method of claim 6, wherein the second value is a shortest possible time it takes for the slit and score heads to be relocated from positions required for the order immediately preceding the given order to positions required for the order immediately following the given order, provided that a number of outs of each of the preceding and following orders is the same.

8. The method of claim 1, wherein the specifications comprise one or more of a length of each order, a number of outs of each order, a trim of each order, and a desired run speed of the slitter/scorer.

9. The method of claim 1, further comprising sorting and scheduling a plurality of customer orders into the prior, current, or subsequent paper group queues according to paper basis weight and paper dimensionality prior to carrying out the remainder of the method.

10. The method of claim 1, further comprising repeating the steps of determining and flagging the potential bracketing pairs and searching the current paper group queue to determine if a bracketing pair can be formed for each order that has been flagged as a short order.

11. The method of claim 1, wherein before determining and flagging the potential bracketing pairs, the method further comprises determining if any no-trim orders are present in the current paper group queue, and if so, reorganizing the orders in the current paper group queue such that a no-trim order immediately follows the given short order.

12. The method of claim 1, further comprising determining if a trim width on the order immediately following the given short order exceeds a certain width, and if not, searching the current paper group queue again to determine if a different bracketing pair can be formed from the orders in the current paper group queue.

13. A non-transient computer readable medium programmed with computer readable code that upon execution by a processor causes the processor to execute a method of sorting orders to be run on a multi-section slitter/scorer at a corrugator dry end, the method comprising:
collecting specifications of orders in a current paper group queue and at least one of a prior and a subsequent paper group queue;
based on the specifications of the orders in the current paper group queue, calculating run times for the orders in the current paper group queue;
calculating slit and score head recovery times for the orders in the current paper group queue by comparing the specifications of an order immediately preceding a given order in the current paper group queue with the specifications of an order immediately following the given order in the current paper group queue;
determining for which orders in the current paper group queue the slit and score head recovery times exceed the run times, and flagging these orders as short orders;
for a given short order, determining pairs of preceding and following orders that would require recovery times less than the given short order's run time, and flagging these as potential bracketing pairs;
searching the current paper group queue to determine if a bracketing pair can be formed from the orders in the current paper group queue, and if so, reorganizing the orders in the current paper group queue such that one of the orders in the bracketing pair immediately precedes the given short order and the other of the orders in the bracketing pair immediately follows the given short order; and outputting a cut list including the reorganized orders in the current paper group queue to a controller, which thereafter controls at least one robot that positions slit and score heads on the slitter/scorer according to specifications of orders in the cut list.

14. The non-transient computer readable medium of claim 13, wherein the method further comprises:
   if a bracketing pair cannot be formed from orders in the current paper group queue, searching the at least one of the prior and subsequent paper group queues to determine if a bracketing pair can be formed from an order in the current paper group queue and an order in the at least one of the prior and subsequent paper group queues, and if so, reorganizing the orders in at least one of the current, prior, and subsequent paper group queues such that one of the orders in the bracketing pair immediately precedes the given short order and the other of the orders in the bracketing pair immediately follows the given short order; and
   if a bracketing pair cannot be formed from orders in the current paper group queue, or from orders in the current paper group queue and the at least one of the prior and subsequent paper group queues, reorganizing the current paper group queue such that the given short order is scheduled to split a long order into two shorter segments.

15. The non-transient computer readable medium of claim 13, wherein the method further comprises determining which orders in the current paper group queue have a run time of less than a first value, and computing run times and recovery times for only the orders having the run time of less than the first value.

16. The non-transient computer readable medium of claim 15, wherein the method further comprises determining if the run time for the given short order is less than a second value, and if so, instead of searching for the potential bracketing pairs, providing an instruction to run the slitter/scorer at a slower speed such that the run time for the given short order does not exceed a calculated recovery time for the slit and score heads to be relocated from positions required for an order immediately preceding the given short order to positions required for an order immediately following the given short order.

17. The non-transient computer readable medium of claim 13, wherein the method further comprises sorting and scheduling a plurality of customer orders into the prior, current, or subsequent paper group queues according to paper basis weight and paper dimensionality prior to carrying out the remainder of the method.

18. The non-transient computer readable medium of claim 13, wherein the method further comprises repeating the steps of determining and flagging the potential bracketing pairs and searching the current paper group queue to determine if a bracketing pair can be formed for each order that has been flagged as a short order.

19. The non-transient computer readable medium of claim 13, wherein before determining and flagging the potential bracketing pairs, the method further comprises determining if any no-trim orders are present in the current paper group queue, and if so, reorganizing the orders in the current paper group queue such that a no-trim order immediately follows the given short order.

20. The non-transient computer readable medium of claim 13, wherein the method further comprises determining if a trim width on the order immediately following the given short order exceeds a certain width, and if not, searching the current paper group queue again to determine if a different bracketing pair can be formed from the orders in the current paper group queue.

* * * * *